(12) United States Patent
Engels et al.

(10) Patent No.: US 11,760,407 B2
(45) Date of Patent: Sep. 19, 2023

(54) STEER-BY-WIRE STEERING SYSTEMS FOR VEHICLES AND RELATED METHODS

(71) Applicant: Ford Global Technologies, LLC, Dearborn, MI (US)

(72) Inventors: Frank Peter Engels, Solingen (DE); Oliver Nehls, Düsseldorf (DE); Sergio Codonesu, Aachen (DE); Florian Rath, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/525,030

(22) Filed: Nov. 12, 2021

(65) Prior Publication Data

US 2022/0073128 A1    Mar. 10, 2022

Related U.S. Application Data

(63) Continuation of application No. 16/424,056, filed on May 28, 2019, now Pat. No. 11,214,296.

(30) Foreign Application Priority Data

Jun. 4, 2018    (DE) .......................... 102018208726.1

(51) Int. Cl.
*B62D 5/00* (2006.01)
*B62D 6/10* (2006.01)
(Continued)

(52) U.S. Cl.
CPC ........... *B62D 5/006* (2013.01); *B62D 5/0421* (2013.01); *B62D 3/02* (2013.01); *B62D 6/10* (2013.01)

(58) Field of Classification Search
None
See application file for complete search history.

(56) References Cited

U.S. PATENT DOCUMENTS

| 6,896,089 B2 | 5/2005 | Mills |
| 2003/0146038 A1 | 8/2003 | Mills et al. |
| 2005/0224276 A1* | 10/2005 | Sugitani ................. B62D 6/008 180/402 |

FOREIGN PATENT DOCUMENTS

DE    102005015816 A1    10/2005

OTHER PUBLICATIONS

German Patent and Trademark Office, "Office Action", issued in connection with application No. 1 0 2018 208 726.1, dated Oct. 15, 2019, with machine translation, 9 pages.
(Continued)

*Primary Examiner* — Adam D Tissot
(74) *Attorney, Agent, or Firm* — Lorne Forsythe; HANLEY, FLIGHT & ZIMMERMAN, LLC

(57) ABSTRACT

Steer-by-wire steering systems for vehicles and related methods are described herein. An example steer-by-wire steering system includes a steering wheel angle sensor to detect a current steering wheel angle ($\alpha$) of a steering wheel of the motor vehicle, a steering actuator to generate a variable steering torque on a steerable wheel of the motor vehicle, a steering angle sensor to detect a current steering angle ($\beta$) of the steerable wheel, and a steer-by-wire controller to process signals from the steering wheel angle sensor and the steering angle sensor and control the steering actuator based on the signals. The steer-by-wire controller is configured to vary a transmission ratio between a change in the steering wheel angle ($\alpha$) and a change in the steering angle ($\beta$).

20 Claims, 3 Drawing Sheets

(51) Int. Cl.
  *B62D 5/04* (2006.01)
  *B62D 3/02* (2006.01)

(56) References Cited

OTHER PUBLICATIONS

United States Patent and Trademark Office, "Non-Final Office Action," issued in connection with U.S. Appl. No. 16/424,056, dated Jul. 7, 2021, 9 pages.

United States Patent and Trademark Office, "Notice of Allowance and Fee(s) Due," issued in connection with U.S. Appl. No. 16/424,056, dated Aug. 11, 2021, 7 pages.

* cited by examiner

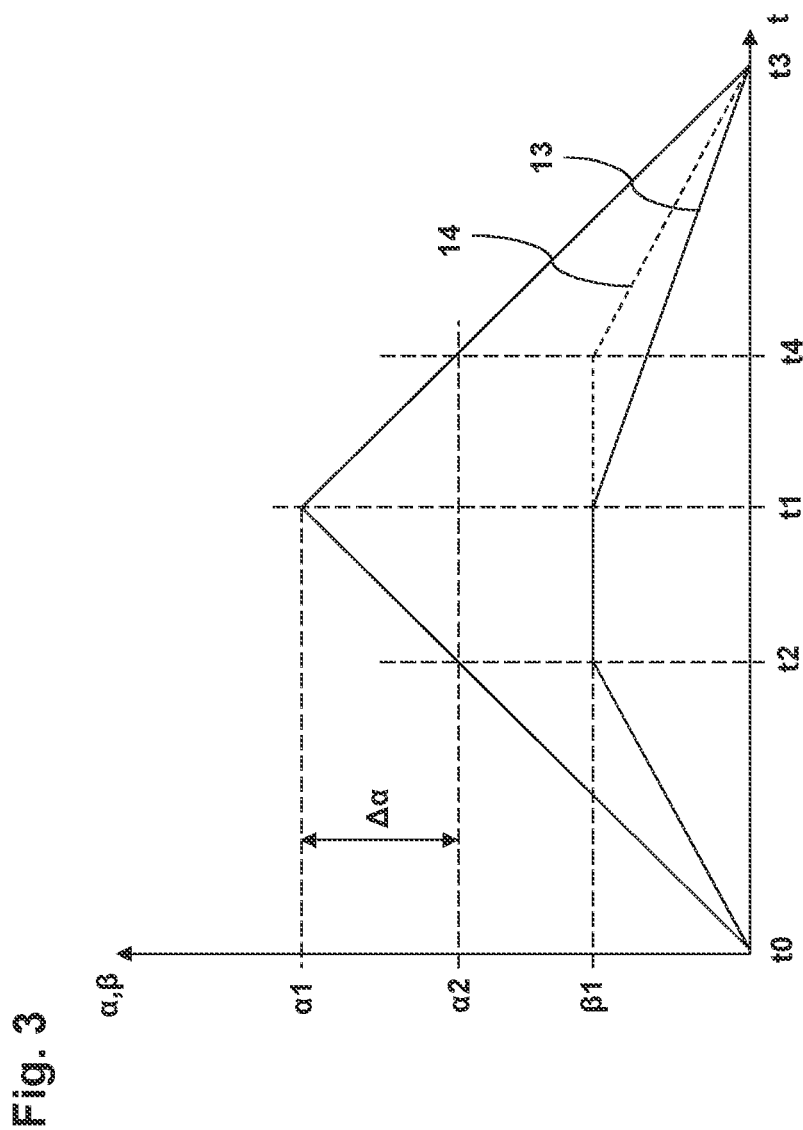

STEER-BY-WIRE STEERING SYSTEMS FOR VEHICLES AND RELATED METHODS

RELATED APPLICATIONS

This patent arises from a continuation of U.S. application Ser. No. 16/424,056, titled "Steer-By-Wire Steering Systems for Vehicles and Related Methods," filed May 28, 2019, which claims priority to German Patent Application No. 102018208726.1, filed Jun. 4, 2018, both of which are hereby incorporated by this reference in their entireties.

FIELD OF THE DISCLOSURE

This disclosure relates generally to vehicles, and, more particularly, to steer-by-wire steering systems for vehicles and related methods.

BACKGROUND

Known vehicles typically include a mechanical linkage that connects the steering wheel to the front wheels of the vehicle and enables a driver to steer the vehicle by rotating the steering wheel. For example, many known steering systems include rack and pinion gears that translate rotational motion of a steering wheel to linear actuation or movement of one or more tie rods, which are connected to the front wheels of the vehicle. The tie rods change the angle of the front wheels, thereby turning the wheels and steering the vehicle.

In recent years, steer-by-wire systems have been implemented in vehicles. Steer-by-wire systems eliminate traditional mechanical linkage assemblies between the steering wheel and the wheels of the vehicle. Instead, an actuator operates to turn the wheels based on a rotational angle of the steering wheel.

SUMMARY

An example steer-by-wire steering system for a motor vehicle disclosed herein includes a steering wheel angle sensor to detect a current steering wheel angle ($\alpha$) of a steering wheel of the motor vehicle, a steering actuator to generate a variable steering torque on a steerable wheel of the motor vehicle, a steering angle sensor to detect a current steering angle ($\beta$) of the steerable wheel, and a steer-by-wire controller to process signals from the steering wheel angle sensor and the steering angle sensor and control the steering actuator based on the signals, the steer-by-wire controller configured to vary a transmission ratio between a change in the steering wheel angle ($\alpha$) and a change in the steering angle ($\beta$). The steer-by-wire controller is configured to: activate the steering actuator such that the steering angle ($\beta$) is reduced from a start of a reduction of the steering wheel angle ($\alpha$), after an immediately preceding exceedance of a steering wheel stop angle ($\alpha 2$) associated with a maximum steering angle ($\beta 1$), by a transmission ratio based on the steering wheel angle ($\alpha$) given at the start of the reduction; or activate the steering actuator such that the steering angle ($\beta$) is reduced during the reduction of the steering wheel angle ($\alpha$) only once the steering wheel stop angle ($\alpha 2$) is reached by a same transmission ratio as a transmission ratio immediately before the reduction of the steering wheel angle ($\alpha$).

An example method of operating a steer-by-wire steering system of a motor vehicle disclosed herein includes detecting a current steering wheel angle ($\alpha$) of a steering wheel of the motor vehicle, and detecting a current steering angle ($\beta$) of a steerable wheel of the motor vehicle. The steer-by-wire steering system includes a steering actuator to generate a variable steering torque on the steerable wheel based on the steering wheel angle ($\alpha$) and the steering angle ($\beta$). A transmission ratio between a change in the steering wheel angle ($\alpha$) and a change in the steering angle ($\beta$) is variable. The method further includes activating the steering actuator such that: the steering angle ($\beta$) is reduced from the start of a reduction of the steering wheel angle ($\alpha$), after an immediately preceding exceedance of a steering wheel stop angle ($\alpha 2$) associated with a maximum steering angle ($\beta 1$), by a transmission ratio based on the steering wheel angle ($\alpha$) given at the start of the reduction; or the steering angle ($\beta$) is reduced during the reduction of the steering wheel angle ($\alpha$) only once the steering wheel stop angle ($\alpha 2$) is reached with a same transmission ratio as a transmission ratio immediately before the reduction of the steering wheel angle ($\alpha$).

BRIEF DESCRIPTION OF THE DRAWINGS

FIG. 3 is a diagram of two further example steering operations implemented by the steer-by-wire steering system of FIG. 1.

Figure 1:
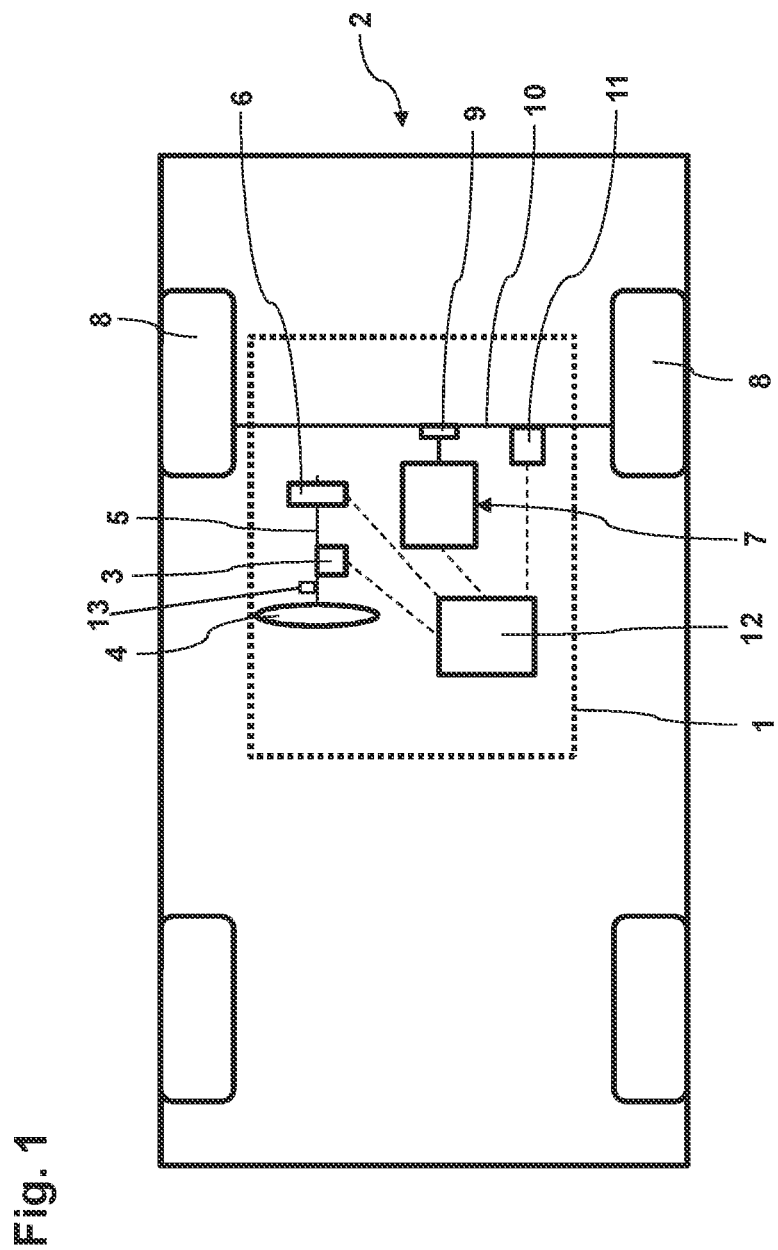
FIG. 1 is a schematic representation of an example steer-by-wire steering system implemented on an example motor vehicle and constructed in accordance with the teachings of this disclosure.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components that may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Conventional motor vehicles (e.g., cars) have a steering system with or without steering support (power steering).

These conventional steering systems have a mechanical connection between a steering wheel of the motor vehicle and steerable wheels of the motor vehicle. The number of successive steering wheel turns performed in the same direction is restricted by limited mobility of a toothed rack of a steering gear of the steering system.

Some motor vehicles employ a steer-by-wire steering system in which there is no mechanical connection between the steering wheel and the steerable wheels. Some steer-by-wire steering systems include a feedback actuator for temporarily generating a variable steering resistance on the steering wheel in order to be able to provide the driver with feedback via the steering wheel about the operating states of the steerable wheels that is comparable to the feedback that a driver receives in a conventional steering system with a mechanical connection between the steering wheel and the steerable wheels. Furthermore, steer-by-wire steering systems include an electromechanical steering actuator for temporarily generating a variable steering torque on the steerable wheels. The steering actuator may engage a toothed rack of a steering gear.

In a steer-by-wire steering system, the steerable wheels can be mechanically actuated independently of the steering wheel. Additionally, the steering wheel can be mechanically actuated (e.g., rotated by the driver) independently of the steerable wheels. As a result, it possible to implement different transmission ratios between a change in the steering wheel angle and a change in the steering angle of the steerable wheels. Because the steering wheel is not directly mechanically connected to the wheels, the steering wheel is capable of being rotated indefinitely in either direction, beyond a steering wheel stop angle that corresponds to the maximum steering angle of the wheels. Therefore, the steer-by-wire steering system may include a device to indicate to the driver when the maximum steering angle has been reached. In some examples, the feedback actuator is used to indicate to the driver the steering wheel angle at which the steerable wheels are maximally turned and/or at which a maximum steering angle is achieved. Due to the variable transmission ratios between the change in steering wheel angle and the change in steering angle, this steering wheel angle can also vary. Alternatively, different means than the feedback actuator may be used to indicate to the driver the fact that the steering wheel angle in which the steerable wheels are maximally turned, such as by means of a blocking mechanism or braking mechanism that engages with a steering column.

If the feedback actuator is used for indicating the steering wheel angle at which the steerable wheels are maximally turned, the feedback actuator for generating a correspondingly high steering resistance must be designed to prevent the steering wheel from being turned further when the steerable wheels are maximally turned. The high-performance design of the feedback actuator significantly influences the size and the price of the feedback actuator as well as the installation space provided for the feedback actuator and the functional safety.

U.S. Patent Publication No. 2003/0146038 (now U.S. Pat. No. 6,896,089) describes a steer-by-wire steering system for the steering of steerable wheels of a motor vehicle. The steering system includes a steering wheel and a steering input shaft, which is mechanically connected to the steering wheel. A housing structure is arranged near the steering input shaft. A male element is provided on the housing structure, and a female receptacle is configured in the steering input shaft to snugly accommodate the male element. The female receptacle has a pair of end walls for limiting the rotational motion of the steering wheel. The steering system additionally has a steering actuator for driving the steerable wheels in response to turning of the steering wheel.

Disclosed herein are example steer-by-wire steering systems and methods that address the problem of reducing maximum steering resistance to be applied by a feedback actuator of a steer-by-wire steering system and thereby reduce the costs for the feedback actuator.

Example steer-by-wire steering systems for motor vehicles are disclosed herein. An example steer-by-wire steering system disclosed herein includes at least one steering wheel angle sensor for detecting a current steering wheel angle of a steering wheel of the motor vehicle, at least one feedback actuator for at least temporarily generating a variable steering resistance on the steering wheel, at least one steering actuator for at least temporarily generating a variable steering torque on at least one steerable wheel of the motor vehicle, at least one steering angle sensor for detecting a current steering angle of the steerable wheel, and at least one set of system electronics (e.g., a steer-by-wire controller) for processing signals from the steering wheel angle sensor and from the steering angle sensor and for activating the feedback actuator and/or the steering actuator in consideration of the signals from the steering wheel angle sensor and the steering angle sensor. The system electronics are configured to vary a transmission ratio between a change in the steering wheel angle and a change in the steering angle as a function of detected vehicle parameters.

In some examples, the system electronics of the example steer-by-wire steering system are configured to activate the steering actuator in such a way that either the steering angle is reduced from the start of a reduction of the steering wheel angle after an immediately preceding exceedance of a steering wheel stop angle associated with a maximum steering angle by a transmission ratio that is constant or varies in a prescribed way and that is selected as a function of the current steering wheel angle given at the beginning of the reduction, or the steering angle is reduced during the reduction of the steering wheel angle only once the steering wheel stop angle is reached with the same transmission ratio as the transmission ratio immediately before the reduction of the steering wheel angle.

In some examples, the feedback actuator is employed to indicate reaching the maximum steering angle of the steerable wheel. In some such examples, the feedback actuator generates relatively minor steering resistance. Thus, it is possible for the driver to continue turning the steering wheel after the steering wheel stop angle that indicates the maximum steering angle has been reached. In particular, the feedback actuator does not generate steering resistance with greater torque than the opposite torque that acts upon the steering wheel when actuated by the driver. Therefore, because the feedback actuator does not have to generate a correspondingly high level of torque, the feedback actuator can be designed to be correspondingly less powerful and smaller and can thus be produced more cost-effectively. Furthermore, in such an example, a blocking mechanism or braking mechanism does not additionally have to be installed to prevent the driver from turning the steering wheel beyond the steering wheel stop angle. As such, the examples disclosed herein result in cost-effective and space-saving design of a steer-by-wire steering system.

By "over-steering" the steering wheel after exceeding the steering wheel stop angle, a misalignment of the steering wheel angle relative to the steering angle occurs, because the steerable wheel cannot be turned any further for mechanical reasons, such as due to the narrowness of a toothed rack of a steering gear that is connected to the steerable wheel. This misalignment is progressively redressed entirely by the disclosed examples during a reduction of the steering wheel angle following the immediately preceding exceedance of the steering wheel stop angle until both the steering wheel angle and the steering angle have a value of zero.

To this end, the system electronics can include and/or perform an equalization algorithm, for example, which compensates for the relative misalignment between the steering wheel and the steerable wheel as a function of the current steering wheel angle given at the beginning of the reduction of the steering wheel angle relative to the steering wheel stop angle and/or the maximum steering angle of the steerable wheel, or which selects a suitable compensation strategy. The equalization algorithm ensures that the entire relative misalignment is eliminated in a manner that is unnoticeable to the driver, while the equalization algorithm ensures, by activating the steering actuator, that the steerable wheel is moved back to its central position associated with directional stability in accordance with the steering input by the driver by means of the steering wheel. Additionally, the system electronics ensure that the misalignment is completely eliminated when the steering wheel angle has been reduced to a value of zero.

In one example technique or equalization algorithm disclosed herein, the system electronics are configured to activate the steering actuator in such a way that the steering angle of the steerable wheel is reduced from the beginning of the reduction of the steering wheel angle of the steering wheel after an immediately preceding exceedance of the steering wheel stop angle of the steering wheel associated with the maximum steering angle of the steerable wheel by a transmission ratio that is constant or varies in a prescribed way and that is selected as a function of the current steering wheel angle given at the beginning of the reduction. In so doing, the steerable wheel is started to move in the direction of its central position from the beginning of the reduction of the steering wheel angle, which produces both acoustic feedback, such as via rubbing of a tire of the steerable wheel over the respective driving surface, and a vehicle reaction, not only in a moving motor vehicle but also in a stationary motor vehicle. In some examples, this is advantageous because the driver may not have noticed that he or she has brought about the relative misalignment (although the misalignment can be clearly and uncomfortably noticeable in a reduction of the steering wheel angle if the steerable wheel is not moved back immediately after the beginning of the reduction of the steering wheel angle, as disclosed herein). For a transmission ratio that varies in a prescribed way, it is possible, for example, to begin with a transmission ratio which is more indirect than a transmission ratio immediately before the reduction of the steering wheel angle of the steering wheel and which is made more direct thereafter on the basis of the steering wheel angle and/or a steering wheel angular velocity in order to completely eliminate the relative misalignment until the steering wheel angle of zero is achieved.

In another example technique or equalization algorithm disclosed herein, the system electronics are configured to activate the steering actuator in such a way that the steering angle of the steerable wheel is reduced during the reduction of the steering wheel angle of the steering wheel only once the steering wheel stop angle of the steering wheel is achieved at the same transmission ratio as the transmission ratio immediately before the reduction of the steering wheel angle of the steering wheel. Thus, the reduction of the steering angle is then only started later with a delay when the steering wheel angle is reduced so that those steering wheel angles that are greater than the steering wheel stop angle are not taken into account when activating the steering actuator. The relative misalignment between the steering wheel angle and the steering angle is thereby offset before the steering wheel is actuated for a steering movement of the steerable wheel.

In some examples, the steering wheel angle sensor is arranged at least partly on a steering column that is non-rotatably connected to the steering wheel or directly on the steering wheel. The steering wheel angle sensor is or can be linked to the system electronics via at least one electrical line or wirelessly. In some examples, the steer-by-wire steering system has two or more steering wheel angle sensors.

In some examples, the feedback actuator engages the steering column to transmit a torque to the steering column. This torque generates a corresponding steering resistance on the steering wheel. In some examples, the feedback actuator is an electromechanical actuator. Using the feedback actuator, the steering resistance can be generated during particular steering processes, in which the current steering wheel angle is sufficiently approaching the steering wheel stop angle. In addition, other haptically perceivable feedback can also be produced on the steering wheel by means of the feedback actuator, such as feedback that permits a conclusion about the surface profile of a driving surface on which the vehicle is currently traveling.

In some examples, the steering actuator includes an electric motor with a pinion, which meshes with a toothed rack that is connected to the steerable wheel or two steerable wheels of a vehicle axle. The pinion and the toothed rack form at least a part of a steering gear of the motor vehicle. In other examples, the example steer-by-wire steering system may include a separate steering actuator for each steerable wheel, such that the steerable wheels can be actuated independently of one another (e.g., mechanically, and so the steering angles of the steerable wheels can also slightly deviate from one another, if desired).

In some examples, the steering angle sensor is arranged on the steering actuator, on the toothed rack of the steering gear, or on a wheel suspension of the steerable wheel. The steering angle sensor is or can be linked to the system electronics via at least one electrical line or wirelessly. In some examples, the steer-by-wire steering system has two or more steering angle sensors. For example, the steer-by-wire steering system may include a separate steering angle sensor for each steerable wheel.

In some examples, the system electronics include at least one microprocessor, by which an equalization algorithm can be carried out to compensate for the relative misalignment between the steering wheel angle and the steering angle. Additionally, the system electronics may include at least one electronic data storage device, which the microprocessor can access to process the sensor signals. The system electronics are configured to control and/or regulate current supply to the feedback actuator and the steering actuator, in particular taking into account the signals from the steering wheel angle sensor and the steering angle sensor. The system electronics can be configured to make the transmission ratio between the change in the steering wheel change and the change in the steering angle more direct as driving speed increases, and vice versa. A direct transmission ratio is distinguished in that a steering movement of the steering wheel by a particular amount results in a smaller variation of the steering angle of the steerable wheel than is the case with a more indirect transmission ratio. The system electronics can activate the feedback actuator in such a way that the steering resistance generated by the feedback actuator increases sharply with the steering wheel angle, e.g. disproportionally, at least at the start of generating the steering resistance.

The example steer-by-wire steering systems and related methods can be implemented in connection with any type of motor vehicle, such as a passenger vehicle or a utility vehicle, for instance. The motor vehicle can have a conventional drive (e.g., gas-powered engine) or it can be an electric vehicle or a hybrid electric vehicle. The examples disclosed herein relate to a motor vehicle that is equipped with a steer-by-wire steering system.

In some examples, the example steer-by-wire steering system advantageously includes at least one mechanical steering wheel angle limiter that mechanically defines a maximum steering wheel angle that is greater than the steering wheel stop angle at a most indirect transmission ratio that can be provided by the system electronics. In this manner, the driver is prevented from turning the steering wheel arbitrarily further in a turning direction, which would also lead to an arbitrarily large relative misalignment between the steering wheel angle and the steering angle. An example steering wheel angle limiter that can be used is described in U.S. Patent Publication No. US 2003/0146038, which is hereby incorporated by reference in its entirety. The steering wheel angle limiter is configured such that, at any transmission ratio selected by the system electronics, the steering wheel is prevented from being mechanically stopped during a steering movement before the steering wheel angle has reached the respective steering wheel stop angle. The design of the mechanical steering wheel angle limiter can be made in accordance with the desired most indirect transmission ratio. In other examples, other steering wheel angle limiters may be used in addition to or as an alternative to the limiter described in U.S. Patent Publication No. US 2003/0146038.

In some examples, the system electronics of the example steer-by-wire steering system are configured to detect a steering wheel turning speed from the signals of the steering wheel angle sensor and to activate the feedback actuator in such a way that the steering resistance is generated until the steering wheel stop angle is reached, taking into account the steering wheel turning speed. In this manner, for example, the steering resistance which is desired when the steering wheel stop angle has been reached can be built up more quickly at a higher steering wheel turning speed than when the steering wheel has a lower steering wheel turning speed.

In some examples, the system electronics are configured to activate the feedback actuator in such a way that, when the steering wheel angle is increased after reaching a predetermined steering wheel angle, which is not equal to zero and which is less than the steering wheel stop angle, the steering resistance is increased to a steering resistance value that is provided when the steering wheel stop angle is reached and that is less than or equal to a maximum steering resistance, and is reduced when the steering wheel angle is reduced after exceeding the steering wheel stop angle. For example, the steering resistance can increase monotonously up to the steering resistance value given when the steering wheel stop angle is reached. Alternatively, the steering resistance can increase in a way that is not correspondingly monotonous and, for instance, can briefly increase sharply before the steering wheel stop angle is reached and then decrease somewhat again in order to more clearly indicate to the driver that the steering wheel stop angle has been exceeded. The reduction of the steering resistance after exceeding the steering wheel stop angle can occur in the form of a monotonously or non-monotonously decreasing steering resistance. By beginning to increase the steering resistance before reaching the steering wheel stop angle, it is indicated to the driver in a timely manner that the maximum steering operation has been reached. When the steering wheel is turned upon reaching the steering wheel stop angle, the steering resistance can be increased to a prescribed value that can be maintained until the mechanically defined maximum steering wheel angle is reached, as long as the steering wheel angle is increased. As soon as the steering wheel angle is again reduced by a steering operation, the steering resistance can be reduced to a normal steering resistance range that had prevailed before the steering wheel stop angle was exceeded. In some examples, the maximum steering resistance is the steering resistance that can be maximally generated by the feedback actuator. In other examples, the maximum steering resistance is lower than the steering resistance that can be maximally generated by the feedback actuator. This results in the possibility of generating the steering resistance as a function of the steering wheel angular velocity in order to produce a steering sensation that is more similar to a steering sensation of a conventional mechanical steering system.

In some examples, the system electronics are configured to activate the feedback actuator in such a way that, when the steering wheel angle is reduced, the steering resistance is varied in accordance with the steering resistance when the steering wheel angle is increased as a function of a change in the steering wheel angle. An intuitive steering sensation is thereby conveyed to the driver. A prescribed relationship between the steering resistance and the steering wheel angle during the reduction of the steering wheel angle can correspond to a prescribed relationship between the steering resistance and the steering wheel angle during the increase in the steering angle.

Another advantage of the example systems and methods disclosed herein is that the system electronics are configured to establish a new transmission ratio after a reduction of the steering wheel angle to a value that is lower than the steering wheel stop angle. The compensation operation for completely compensating for the relative misalignment between the steering wheel angle and the steering angle is thereby ended and a normal operation of the steer-by-wire steering system is begun. Accordingly, the transmission ratio can be modified after exceeding the steering wheel stop angle as soon as the current steering wheel angle is again smaller than the steering wheel stop angle.

Also disclosed herein are example methods for operating a steer-by-wire steering system of a motor vehicle. In some examples, a current steering wheel angle of a steering wheel of the motor vehicle is detected, a current steering angle of a steerable wheel of the motor vehicle is detected, a feedback actuator for at least temporarily generating a variable steering resistance on the steering wheel and/or a steering actuator for at least temporarily generating a variable steering torque on the steerable wheel in consideration of the current steering wheel angle and the current steering angle are or is activated, and a transmission ratio between a change in the steering wheel angle and a change in the steering angle as a function of detected vehicle parameters is varied.

Example methods disclosed herein include activing the steering actuator in such a way that either the steering angle is reduced from the start of a reduction of the steering wheel angle after an immediately preceding exceedance of a steering wheel stop angle associated with a maximum steering angle by a transmission ratio that is constant or varies in a prescribed way and that is selected as a function of the current steering wheel angle given at the beginning of the reduction, or the steering angle is reduced during the reduction of the steering wheel angle only once the steering wheel stop angle is reached with the same transmission ratio as the transmission ratio immediately be-fore the reduction of the steering wheel angle.

The advantages described above with regard to the steer-by-wire steering system are accordingly associated with the method. In particular, the steer-by-wire steering system according to one of the aforementioned examples or any desired combination of at least two of these examples can be used together to carry out the method.

Some example methods disclosed herein include mechanically defining a maximum steering wheel angle that is greater than the steering wheel stop angle at a most indirect transmission ratio. The advantages described above with regard to the corresponding example of the steer-by-wire steering system are accordingly associated with this example.

Some example methods disclosed herein include detecting a steering wheel turning speed from a change in the current steering wheel angle, and activating the feedback actuator in such a way that the steering resistance is generated until the steering wheel stop angle is reached, taking into account the steering wheel turning speed. The advantages described above with regard to the corresponding example of the steer-by-wire steering system are accordingly associated with this example.

Some example methods disclosed herein include activating the feedback actuator in such a way that, when the steering wheel angle is increased after reaching a predetermined steering wheel angle, which is not equal to zero and which is less than the steering wheel stop angle, the steering resistance is increased to a steering resistance value that is provided when the steering wheel stop angle is reached and that is less than or equal to a maximum steering resistance, and is reduced when the steering wheel angle is reduced after exceeding the steering wheel stop angle. The advantages described above with regard to the corresponding example of the steer-by-wire steering system are accordingly associated with this example.

Some examples disclosed herein include activating the feedback actuator in such a way that the steering resistance when the steering wheel angle is reduced is varied in accordance with the steering resistance when the steering wheel angle is increased as a function of a change in the steering wheel angle. The advantages described above with regard to the corresponding example of the steer-by-wire steering system are accordingly associated with this example.

Some example methods disclosed herein include establishing a new transmission ratio after a reduction of the steering wheel angle to a value that is lower than the steering wheel stop angle following a preceding exceedance of the steering wheel stop angle. The advantages described above with regard to the corresponding example of the steer-by-wire steering system are accordingly associated with this example.

FIG. 1 shows a schematic representation of an example steer-by-wire steering system 1 implemented in connection with an example motor vehicle 2. The steer-by-wire steering system 1 has a steering wheel angle sensor 3 for detecting a current steering wheel angle of a steering wheel 4 of the motor vehicle 2. In this example, the steering wheel angle sensor 3 is arranged on a steering column 5 that is non-rotatably coupled to the steering wheel 4.

In the illustrated example, the steer-by-wire steering system 1 includes a feedback actuator 6 for at least temporarily generating a variable steering resistance on the steering wheel 4. In this example, the feedback actuator 6 is arranged on the steering column 5.

In the illustrated example, the steer-by-wire steering system 1 includes a steering actuator 7 for at least temporarily generating a variable steering torque on two steerable wheels 8 of the motor vehicle 2. The steering actuator 7 has a pinion 9, which meshes with a toothed rack 10 that is, in turn, articulatedly connected to the steerable wheels 8. In other examples, separate actuators may be used to independently operate the steerable wheels 8.

In the illustrated example, the steer-by-wire steering system 1 includes a steering angle sensor 11 for detecting a current steering angle of the steerable wheels 8. In this example, the steering angle sensor 11 is arranged on the toothed rack 10.

In the illustrated example, the steer-by-wire steering system 1 includes a steer-by-wire controller 12 (e.g., system electronics). The steer-by-wire controller 12 may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). The steer-by-wire controller 12 is programmed to execute instructions (e.g., stored on a memory) to implement any of the example operations disclosed herein. The steer-by-wire controller 12 receives and processes signals from the steering wheel angle sensor 3 and from the steering angle sensor 11. Additionally, the steer-by-wire controller 12 controls the activation of the feedback actuator 6 and/or the steering actuator 7 based on the signals from the steering wheel angle sensor 3 and the steering angle sensor 11. The steer-by-wire controller 12 is configured to vary a transmission ratio between a change in the steering wheel angle and a change in the steering angle as a function of detected vehicle parameters, such as the driving speed.

In one examples, the steer-by-wire controller 12 is configured to implement a first technique or equalization algorithm in which the steer-by-wire controller 12 activates the steering actuator 7 in such a way that the steering angle is reduced from the start of a reduction of the steering wheel angle after an immediately preceding exceedance of a steering wheel stop angle associated with a maximum steering angle by a transmission ratio that is constant or varies in a prescribed way and that is selected as a function of the current steering wheel angle given at the beginning of the reduction. For example, assume the steering wheel stop angle in the right turning direction is 540°. When the steering wheel 4 reaches the steering wheel stop angle, the steerable wheels 8 are at their maximum steering angle, such as 20°. Assume the driver has rotated to the steering wheel 4 beyond the steering wheel stop angle to a steering wheel angle of 720°. While the steering wheel 4 may be rotated beyond the steering wheel stop angle, the steerable wheels 8 remain at their maximum right steering angle, such as 20°. When the driver starts to turn the steering wheel 4 back in the reverse direction, the steer-by-wire controller 12 immediately activates the steering actuator 7 to begin reducing the steering angle of the steerable wheels 8 in accordance with a new transmission ratio. The transmission ratio may be a constant ratio, such as 36:1 (720°/20°) or a variable ratio. As a result, even though the steering wheel 4 is beyond the steering wheel stop angle, when the driver begins rotating the steering wheel 4 in the reverse direction, an immediate response to provided by the steerable wheels 8.

Alternatively, in another example, the steer-by-wire controller is configured to implement a second technique or equalization algorithm in which the steer-by-wire controller 12 activates the steering actuator 7 in such a way that the steering angle is reduced during the reduction of the steering wheel angle ($\alpha$) only once the steering wheel stop angle is reached with the same transmission ratio as the transmission ratio immediately before the reduction of the steering wheel angle. For example, again assume the steering wheel stop angle is 540° and the driver has rotated the steering wheel 4 to a steering angle of 720°. When the driver rotates the steering wheel 4 in the reverse direction, no steering response is provided until the steering wheel 4 reaches the steering wheel stop angle (540°). Once the steering wheel 4 reaches the steering wheel stop angle, the steer-by-wire controller 12 activates the steering actuator 7 to reduce the steering angle in accordance with a predetermined transmission ratio. In some examples, the predetermined transmission ratio is the same transmission ratio that was implemented when initially rotating the steering wheel 4 from a center position to the steering wheel stop angle. In some examples, the steer-by-wire controller 12 is configured to implement only one of these two techniques. In other examples, the steer-by-wire controller 12 may be capable of implementing both techniques, and the steer-by-wire controller 12 may select one or the other technique based on one or more parameters (e.g., a speed of the motor vehicle 2, a preset driving mode, etc.).

In some examples, the steer-by-wire steering system 1 includes a mechanical steering wheel angle limiter 13, which mechanically defines a maximum steering wheel angle. The steering wheel angle limit 13 can be activated by the steer-by-wire controller 12 to block the steering wheel 4 from being rotated beyond the maximum steering wheel angle in either direction (e.g., ±720°). In some examples, the maximum steering wheel angle is greater than the steering wheel stop angle at a most indirect transmission ratio that can be provided by the steer-by-wire controller 12.

In some examples, the steer-by-wire controller 12 is configured to detect a steering wheel turning speed from the signals of the steering wheel angle sensor 3 and to activate the feedback actuator 6 such that the steering resistance is generated until the steering wheel stop angle is reached, taking into account the steering wheel turning speed.

In some examples, the steer-by-wire controller 12 is configured to activate the feedback actuator 6 in such a way that, when the steering wheel angle is increased after reaching a predetermined steering wheel angle, which is not equal to zero and which is less than the steering wheel stop angle, the steering resistance is increased to a steering resistance value that is provided when the steering wheel stop angle is reached and that is less than or equal to a maximum steering resistance, and is reduced when the steering wheel angle is reduced after exceeding the steering wheel stop angle.

In some examples, the steer-by-wire controller 12 is configured to activate the feedback actuator 6 in such a way that the steering resistance when the steering wheel angle is reduced is varied in accordance with the steering resistance when the steering wheel angle is increased as a function of a change in the steering wheel angle.

In some examples, the system electronics 12 are configured to establish a new transmission ratio after a reduction of the steering wheel angle to a value that is lower than the steering wheel stop angle following a preceding exceedance of the steering wheel stop angle.

Figure 2:
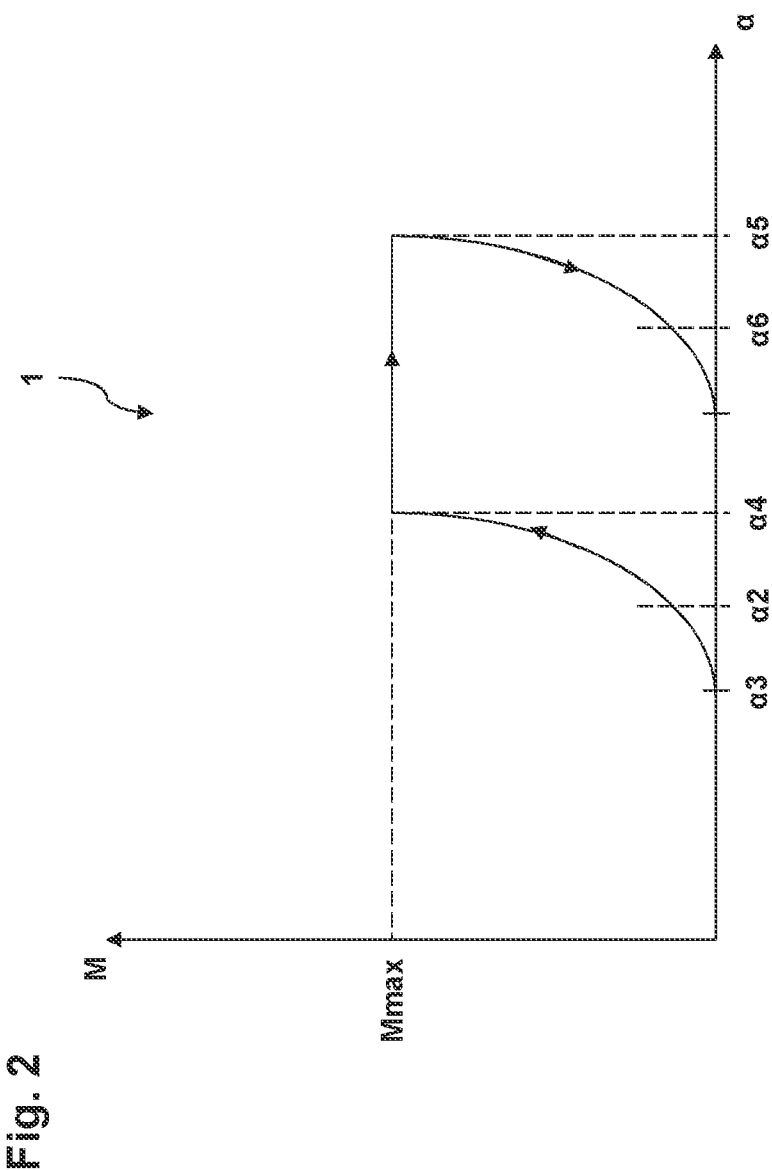
FIG. 2 is a diagram of an example steering operation implemented by the example steer-by-wire steering system of FIG. 1.

FIG. 2 shows a diagram of an example steering operation of the steer-by-wire steering system 1 of FIG. 1. In the illustrated diagram, the steering resistance torque M that can be generated with the feedback actuator 6 (Y-axis) is plotted against the steering wheel angle $\alpha$ (X-axis).

In an example operation, a driver of the motor vehicle 2 may turn the steering wheel 4. The steering wheel angle $\alpha$ is detected by the steering wheel angle sensor 3. The steer-by-wire controller 12 is configured to activate the feedback actuator 6 in such a way that, when the steering wheel angle $\alpha$ is increased after reaching a predetermined steering wheel angle $\alpha 3$, which is not equal to zero and which is smaller than the steering wheel stop angle $\alpha 2$, the steering resistance is increased to a steering resistance value that is provided when the steering wheel stop angle $\alpha 2$ is reached and that is smaller than or equal to a maximum steering resistance with the maximum steering resistance torque Mmax or, in this example, monotonously rises.

In FIG. 2, the steering resistance increases up to the maximum steering resistance Mmax at a steering wheel angle $\alpha 4$ as a result of the actuation of the steering wheel. Thereafter, the driver turns the steering wheel 4 further until steering wheel angle $\alpha 5$ without the steering resistance torque M changing (i.e., the steering resistant torque remains constant). Thereafter, the driver turns the steering wheel 4 such that the steering wheel angle $\alpha$ is reduced. The steer-by-wire controller 12 is configured to activate the feedback actuator 6 in such a way that the steering resistance is reduced or, in this case, monotonously falls with the reduction of the steering wheel angle $\alpha$ after exceeding the steering wheel stop angle $\alpha 2$. In particular, the steer-by-wire controller 12 is configured to activate the feedback actuator 6 in such a way that the steering resistance when the steering wheel angle $\alpha$ is reduced is varied in accordance with the steering resistance when the steering wheel angle $\alpha$ is increased as a function of a change in the steering wheel angle $\alpha$. The steering angle of the steerable wheel 8 can be reduced starting from the reduction of the steering wheel angle $\alpha$. Alternatively, the steering angle can be reduced during the reduction of the steering wheel angle $\alpha$ after reaching steering wheel angle $\alpha 6$.

In FIG. 2, the curve that begins with steering wheel angle $\alpha 3$ starts at a torque value of zero. However, in other examples, the torque value may not be zero. For example, the curve can also begin at a steering resistance that is greater than zero when the feedback actuator 6 is currently being used to generate other feedback.

FIG. 3 shows a diagram of two further example steering operations of the steer-by-wire steering system 1 of FIG. 1. In the illustrated diagram, steering wheel angle $\alpha$ and steering angle $\beta$ (Y-axis) are plotted over the time t (X-axis).

At point in time t0, both steering wheel angle $\alpha$ and steering angle $\beta$ are equal to zero, and a steering operation begins. During the steering operation, the driver turns the steering wheel until point in time t1, until a steering wheel angle $\alpha 1$ is reached, which is greater than a steering wheel stop angle $\alpha 2$ that is associated with a maximum steering angle $\beta 1$ of the steerable wheels 8 of the motor vehicle 2.

The maximum steering angle $\beta 1$ is reached at point in time t2 and is defined by a mechanical steering angle limiter of the steer-by-wire steering system 1. Between points in time t1 and t2, the maximum steering angle $\beta 1$ is kept constant, and so a relative misalignment (offset $\Delta\alpha = \sigma 1 - \alpha 2$ in the steering angle coordinates) is created between steering wheel angle $\alpha$ and steering angle $\beta$ between these points in time.

At point in time t1, a reduction of the steering wheel angle α begins until point in time t3. In accordance with the first technique or equalization algorithm, the steer-by-wire controller 12 of the steer-by-wire steering system 1 is configured to activate the steering actuator 7 in such a way that the steering angle β is reduced from the start of a reduction of steering wheel angle α after the immediately preceding exceedance of the steering wheel stop angle α2 associated with the maximum steering angle β1 by a constant transmission ratio that is more indirect than a transmission ratio immediately before the reduction of the steering wheel angle α. This is indicated by the solid line 13 in FIG. 3. Alternatively, in accordance with the second technique or equalization algorithm, the steer-by-wire controller 12 is configured to activate the steering actuator 7 in such a way that the steering angle β is reduced during the reduction in the steering wheel angle α only once the steering wheel stop angle α2 at point in time t4 is achieved at the same transmission ratio as the transmission ratio immediately before the steering wheel angle α is reduced and is kept constant at the value β1 between points in time t3 and t4. This is indicated by the dashed line 14 in FIG. 3.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The following paragraphs provide various examples of the examples disclosed herein.

Example 1 includes a steer-by-wire steering system for a motor vehicle. The steer-by-wire steering system includes a steering wheel angle sensor to detect a current steering wheel angle (α) of a steering wheel of the motor vehicle, a steering actuator to generate a variable steering torque on a steerable wheel of the motor vehicle, a steering angle sensor to detect a current steering angle (β) of the steerable wheel, and a steer-by-wire controller to process signals from the steering wheel angle sensor and the steering angle sensor and control the steering actuator based on the signals, the steer-by-wire controller configured to vary a transmission ratio between a change in the steering wheel angle (α) and a change in the steering angle (β). The steer-by-wire controller is configured to: activate the steering actuator such that the steering angle (β) is reduced from a start of a reduction of the steering wheel angle (α), after an immediately preceding exceedance of a steering wheel stop angle (α2) associated with a maximum steering angle (β1), by a transmission ratio based on the steering wheel angle (α) given at the start of the reduction; or activate the steering actuator such that the steering angle (β) is reduced during the reduction of the steering wheel angle (α) only once the steering wheel stop angle (α2) is reached by a same transmission ratio as a transmission ratio immediately before the reduction of the steering wheel angle (α).

Example 2 includes the steer-by-wire steering system of Example 1, further including a mechanical steering wheel angle limiter to define a maximum steering wheel angle that is greater than the steering wheel stop angle (α2).

Example 3 includes the steer-by-wire steering system of Examples 1 or 2, further including a feedback actuator to at least temporarily generate a variable steering resistance on the steering wheel.

Example 4 includes the steer-by-wire steering system of Example 3, wherein the steer-by-wire controller is to detect a steering wheel turning speed from the signals from the steering wheel angle sensor, and activate the feedback actuator, based on the steering wheel turning speed, such that the steering resistance is generated until the steering wheel stop angle (α2) is reached.

Example 5 includes the steer-by-wire steering system of Examples 3 or 4, wherein the steer-by-wire controller is to activate the feedback actuator such that, when the steering wheel angle (α) is increased after reaching a predetermined steering wheel angle (α3), which is not equal to zero and which is less than the steering wheel stop angle (α2), the steering resistance is increased to a steering resistance value that is provided when the steering wheel stop angle (α2) is reached and that is less than or equal to a maximum steering resistance, and is reduced when the steering wheel angle (α) is reduced after exceeding the steering wheel stop angle (α2).

Example 6 includes the steer-by-wire steering system of Example 5, wherein the steer-by-wire controller is to activate the feedback actuator such that the steering resistance when the steering wheel angle (α) is reduced is varied in accordance with the steering resistance when the steering wheel angle (α) is increased as a function of a change in the steering wheel angle (α).

Example 7 includes the steer-by-wire steering system of any of Examples 1-6, wherein the steer-by-wire controller is to establish a new transmission ratio after the steering wheel angle (α) is reduced to a value that is lower than the steering wheel stop angle (α2).

Example 8 includes the steer-by-wire steering system of any of Examples 1-7, wherein the transmission ratio based on the current steering wheel angle (α) given at the start of the reduction is a constant transmission ratio.

Example 9 includes the steer-by-wire steering system of any of Examples 1-8, wherein the steering actuator is to generate the variable steering torque on two steerable wheels of the motor vehicle.

Example 10 includes the steer-by-wire steering system of Example 9, wherein the steering wheel sensor is arranged on a toothed rack connected to the steerable wheels.

Example 11 includes a method of operating a steer-by-wire steering system of a motor vehicle. The method includes detecting a current steering wheel angle (α) of a steering wheel of the motor vehicle, and detecting a current steering angle (β) of a steerable wheel of the motor vehicle. The steer-by-wire steering system includes a steering actuator to generate a variable steering torque on the steerable wheel based on the steering wheel angle (α) and the steering angle (β). A transmission ratio between a change in the steering wheel angle (α) and a change in the steering angle (β) is variable. The method further includes activating the steering actuator such that: the steering angle (β) is reduced from the start of a reduction of the steering wheel angle (α), after an immediately preceding exceedance of a steering wheel stop angle (α2) associated with a maximum steering angle (β1), by a transmission ratio based on the steering wheel angle (α) given at the start of the reduction; or the steering angle (β) is reduced during the reduction of the steering wheel angle (α) only once the steering wheel stop angle (α2) is reached with a same transmission ratio as a transmission ratio immediately before the reduction of the steering wheel angle (α).

Example 12 includes the method of Example 11, further including activating a mechanical steering wheel angle limiter to define a maximum steering wheel angle that is greater than the steering wheel stop angle (α2).

Example 13 includes the method of Examples 11 or 12, wherein the steer-by-wire steering system includes a feedback actuator to at least temporarily generate a variable steering resistance on the steering wheel.

Example 14 includes the method of Example 13, further including detecting a steering wheel turning speed from a change in the steering wheel angle (α), and activating the feedback actuator, based on the steering wheel turning speed, such that the steering resistance is generated until the steering wheel stop angle (α2) is reached.

Example 15 includes the method of any of Examples 11-14, further including activating the feedback actuator such that, when the steering wheel angle (α) is increased after reaching a predetermined steering wheel angle (α3), which is not equal to zero and which is less than the steering wheel stop angle (α2), the steering resistance is increased to a steering resistance value that is provided when the steering wheel stop angle (α2) is reached and that is less than or equal to a maximum steering resistance, and is reduced when the steering wheel angle (α) is reduced after exceeding the steering wheel stop angle (α2).

Example 16 includes the method of Example 15, further including activating the feedback actuator in such a way that the steering resistance when the steering wheel angle (α) is reduced is varied in accordance with the steering resistance when the steering wheel angle (α) is increased as a function of a change in the steering wheel angle (α).

Example 17 includes the method of any of Examples 11-16, further including establishing a new transmission ratio after a reduction of the steering wheel angle (α) to a value that is lower than the steering wheel stop angle (α2) following a preceding exceedance of the steering wheel stop angle (α2).

Example 18 includes the method of any of Examples 11-17, wherein the transmission ratio based on the steering wheel angle (α) given at the start of the reduction is a constant transmission ratio.

Example 19 includes the method of any of Examples 11-18, wherein the steering actuator is to generate the variable steering torque on two steerable wheels of the motor vehicle.

Example 20 includes the method of Example 19, wherein the steering wheel sensor is arranged on a toothed rack connected to the steerable wheels.

Example 21 includes a steer-by-wire steering system for a motor vehicle. The steer-by-wire steering system has at least one steering wheel angle sensor for detecting a current steering wheel angle (α) of a steering wheel of the motor vehicle, at least one feedback actuator for at least temporarily generating a variable steering resistance on the steering wheel, at least one steering actuator for at least temporarily generating a variable steering torque on at least one steerable wheel of the motor vehicle, at least one steering angle sensor for detecting a current steering angle (β) of the steerable wheel, and at least one set of system electronics for processing signals from the steering wheel angle sensor and from the steering angle sensor and for activating the feedback actuator and/or the steering actuator in consideration of the signals from the steering wheel angle sensor and the steering angle sensor. The system electronics are configured to vary a transmission ratio between a change in the steering wheel angle and a change in the steering angle as a function of detected vehicle parameters. The system electronics are configured to activate the steering actuator in such a way that either the steering angle (β) is reduced from the start of a reduction of the steering wheel angle (α) after an immediately preceding exceedance of a steering wheel stop angle (α2) associated with a maximum steering angle (β1) by a transmission ratio that is constant or varies in a prescribed way and that is selected as a function of the current steering wheel angle (α) given at the beginning of the reduction, or the steering angle (β) is reduced during the reduction of steering wheel angle (α) only once the steering wheel stop angle (α2) is reached with the same transmission ratio as the transmission ratio immediately before the reduction of the steering wheel angle (α).

Example 22 includes the steer-by-wire steering system of Example 21, wherein the steer-by-wire steering system includes at least one mechanical steering wheel angle limiter that mechanically defines a maximum steering wheel angle that is greater than the steering wheel stop angle (α2) at a most indirect transmission ratio that can be provided by the system electronics (12).

Example 23 includes the steer-by-wire steering system of Examples 21 or 22, wherein the system electronics are configured to detect a steering wheel turning speed from the signals of the steering wheel angle sensor and to activate the feedback actuator in such a way that the steering resistance is generated until the steering wheel stop angle (α2) is reached, taking into account the steering wheel turning speed.

Example 24 includes the steer-by-wire steering system of any of Examples 21-23, wherein the system electronics are configured to activate the feedback actuator in such a way that, when the steering wheel angle (α) is increased after reaching a predetermined steering wheel angle (α3), which is not equal to zero and which is smaller than the steering wheel stop angle (α2), the steering resistance is increased to a steering resistance value that is provided when the steering wheel stop angle is reached and that is smaller than or equal to a maximum steering resistance, and is reduced when the steering wheel angle (α) is reduced after exceeding the steering wheel stop angle (α2).

Example 25 includes the steer-by-wire steering system of Example 24, wherein the system electronics are configured to activate the feedback actuator in such a way that the steering resistance when the steering wheel angle (α) is reduced is varied in accordance with the steering resistance when the steering wheel angle (α) is increased as a function of a change in the steering wheel angle (α).

Example 26 includes the steer-by-wire steering system of any of Examples 21-25, wherein the system electronics are configured to establish a new transmission ratio after a reduction of the steering wheel angle (α) to a value that is lower than the steering wheel stop angle (α2).

Example 27 includes a method for operating a steer-by-wire steering system of a motor vehicle, wherein a current steering wheel angle (α) of a steering wheel of the motor vehicle is detected, a current steering angle (β) of a steerable wheel of the motor vehicle is detected, a feedback actuator for at least temporarily generating a variable steering resistance on the steering wheel and/or a steering actuator for at least temporarily generating a variable steering torque on the steerable wheel in consideration of the current steering wheel angle (α) and the current steering angle (β) are or is activated, and a transmission ratio between a change in the steering wheel angle and a change in the steering angle as a function of detected vehicle parameters is varied. The steering actuator is activated in such a way that either the steering angle (β) is reduced from the start of a reduction of the steering wheel angle (α) after an immediately preceding exceedance of a steering wheel stop angle (α2) associated with a maximum steering angle (β1) by a transmission ratio that is constant or varies in a prescribed way and that is selected as a function of the current steering wheel angle (α) given at the beginning of the reduction, or the steering angle (β) is reduced during the reduction of the steering wheel angle (α) only once the steering wheel stop angle (α2) is reached with the same transmission ratio as the transmission ratio immediately before the reduction of the steering wheel angle (α).

Example 28 includes the method of Example 27, wherein a maximum steering wheel angle is mechanically defined, which is greater than the steering wheel stop angle (α2) at a most indirect transmission ratio.

Example 29 includes the method of Examples 27 or 28, wherein a steering wheel turning speed is detected from a change in the current steering wheel angle (α), and the feedback actuator is activated in such a way that the steering resistance is generated until the steering wheel stop angle (α2) is reached, taking into account the steering wheel turning speed.

Example 30 includes the method of any of Examples 27-29, wherein the feedback actuator is activated in such a way that, when the steering wheel angle (α) is increased after reaching a predetermined steering wheel angle (α3), which is not equal to zero and which is smaller than the steering wheel stop angle (α2), the steering resistance is increased to a steering resistance value that is provided when the steering wheel stop angle is reached and that is smaller than or equal to a maximum steering resistance, and is reduced when the steering wheel angle (α) is reduced after exceeding the steering wheel stop angle (α2).

Example 31 includes the method of Example 30, wherein the feedback actuator is activated in such a way that the steering resistance when the steering wheel angle (α) is reduced is varied in accordance with the steering resistance when the steering wheel angle (α) is increased as a function of a change in the steering wheel angle (α).

Example 32 includes the method of any of Examples 27-31, wherein a new transmission ratio is established after a reduction of the steering wheel angle (α) to a value that is lower than the steering wheel stop angle (α2) following a preceding exceedance of the steering wheel stop angle (α2).

From the foregoing, it will be appreciated that example methods, apparatus, and articles of manufacture have been disclosed that control a transmission ratio to account for over-steering of a steering wheel in a steer-by-wire steering system. The examples disclosed herein enable the use of smaller, lighter, and less expensive feedback actuators because the feedback actuator is not required to be able to stop the steering wheel at the steering wheel stop angle. Some examples disclosed herein also provide feedback to the driver to indicate when the user is approaching or has approached the steering stop wheel angle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A steer-by-wire steering system for a vehicle, the steer-by-wire steering system comprising:
   a steering wheel angle sensor to detect a current steering wheel angle (α) of a steering wheel of the vehicle;
   a steering actuator to generate a variable steering torque on a steerable wheel of the vehicle;
   a steering angle sensor to detect a current steering angle (β) of the steerable wheel; and
   a steer-by-wire controller to process signals from the steering wheel angle sensor and the steering angle sensor and control the steering actuator based on the signals, the steer-by-wire controller to, after the steering wheel exceeds a steering wheel stop angle (α2) associated with a maximum steering angle (β1) of the steerable wheel, activate the steering actuator such that the steering angle (β) of the steerable wheel is reduced during a reduction of the steering wheel angle (α) of the steering wheel when the steering wheel stop angle (α2) is reached, the steering angle (β) of the steerable wheel reduced by a same transmission ratio as a implemented when increasing the steering wheel angle (α) of the steering wheel toward the steering wheel stop angle (α2).

2. The steer-by-wire steering system of claim 1, further including a feedback actuator to generate a variable steering resistance to increase a force needed to turn the steering wheel.

3. The steer-by-wire steering system of claim 2, wherein the steer-by-wire controller is to activate the feedback actuator to indicate to a driver when the steering wheel angle (α) of the steering wheel is at the steering wheel stop angle (α2).

4. The steer-by-wire steering system of claim 2, wherein the steer-by-wire controller is to:
   determine a steering wheel turning speed based on the signals from the steering wheel angle sensor; and activate the feedback actuator, based on the steering wheel turning speed, such that the steering resistance is generated until the steering wheel stop angle ($\alpha 2$) is reached.

5. The steer-by-wire steering system of claim 2, wherein the steer-by-wire controller is to activate the feedback actuator such that, when the steering wheel angle ($\alpha$) is increased after reaching a predetermined steering wheel angle ($\alpha 3$), which is not equal to zero and which is less than the steering wheel stop angle ($\alpha 2$), the steering resistance is increased to a steering resistance value that is provided when the steering wheel stop angle ($\alpha 2$) is reached and that is less than or equal to a maximum steering resistance, and is reduced when the steering wheel angle ($\alpha$) is reduced after exceeding the steering wheel stop angle ($\alpha 2$).

6. The steer-by-wire steering system of claim 5, wherein the steer-by-wire controller is to activate the feedback actuator such that, when the steering wheel angle ($\alpha$) is reduced, the steering resistance is varied in accordance with the steering resistance when the steering wheel angle was increased.

7. The steer-by-wire steering system of claim 1, wherein the transmission ratio based on the current steering wheel angle ($\alpha$) given at the start of the reduction is a constant transmission ratio.

8. The steer-by-wire steering system of claim 1, further including a mechanical steering wheel angle limiter to define a maximum steering wheel angle ($\alpha 1$) that is greater than the steering wheel stop angle ($\alpha 2$).

9. The steer-by-wire steering system of claim 1, wherein the steering actuator is to generate the variable steering torque on two steerable wheels of the vehicle.

10. A vehicle comprising:
a steering wheel;
a steering wheel angle sensor to detect a steering wheel angle of the steering wheel;
a steerable wheel;
a steering actuator to generate torque on the steerable wheel to steer the vehicle;
a steering angle sensor to detect a steering angle of the steerable wheel; and
a controller to:
determine the steering wheel has rotated to an excess steering wheel angle that is beyond a steering wheel stop angle associated with a maximum steering angle of the steerable wheel;
cease activation of the steering actuator while the steering wheel angle is reduced back toward the steering wheel stop angle so that the steerable wheel remains in a same position until the steering wheel stop angle is reached; and
control the steering actuator to reduce the steering angle only once the steering wheel angle reaches the steering wheel stop angle and is further reduced.

11. The vehicle of claim 10, wherein the controller is to control the steering actuator to reduce the steering angle at a transmission ratio that is the same as before the steering wheel angle exceeded the steering wheel stop angle.

12. The vehicle of claim 11, wherein the transmission ratio is a linear relationship between a change in the steering wheel angle and a change in the steering angle.

13. The vehicle of claim 10, further including a feedback actuator to generate a variable steering resistance.

14. The vehicle of claim 13, wherein the controller is to:
activate the feedback actuator such that, when the steering wheel angle is increased after reaching a predetermined steering wheel angle, which is less than the steering wheel stop angle, the steering resistance is increased to a maximum steering resistance when the steering wheel angle reaches the excess steering wheel angle.

15. The vehicle of claim 14, wherein the controller is to:
activate the feedback actuator such that, when the steering wheel angle is reduced after reaching the excess steering wheel angle, the steering resistance is immediately reduced.

16. The vehicle of claim 15, wherein the controller is to activate the feedback actuator to increase the steering resistance in accordance with a first resistance ratio and decrease the steering resistance in accordance with a second resistance ratio, wherein the second resistance ratio is the same as the first resistance ratio.

17. The vehicle of claim 16, wherein the first and second resistance ratios are non-linear.

18. A steer-by-wire steering system for a vehicle, the steer-by-wire steering system comprising:
a steering wheel angle sensor to detect a current steering wheel angle of a steering wheel;
a steering actuator to generate a variable steering torque on a steerable wheel of the vehicle;
a steering angle sensor to detect a current steering angle of the steerable wheel; and
a controller to:
determine the steering wheel has rotated to an excess steering wheel angle that is beyond a steering wheel stop angle associated with a maximum steering angle of the steerable wheel; and
activate the steering actuator such that the steering angle is reduced from a start of a reduction of the steering wheel angle back toward the steering wheel stop angle, wherein the controller is to activate the steering actuator in accordance with a transmission ratio that varies from the start of the reduction of the steering wheel angle.

19. The steer-by-wire steering system of claim 18, wherein a first portion of the transmission ratio at a beginning of the reduction is a first ratio value and a second portion of the transmission ratio after the first portion is a second ratio value.

20. The steer-by-wire steering system of claim 19, wherein the first ratio value includes a first change in the steering angle for a predetermined change in the steering wheel angle, and the second ratio value includes a second change in the steering angle for the predetermined change in the steering wheel angle, the second change being larger than the first change.

* * * * *